April 22, 1952 — H. E. STOVER — 2,593,627
INVERTING APPARATUS
Filed Sept. 8, 1949 — 4 Sheets-Sheet 1
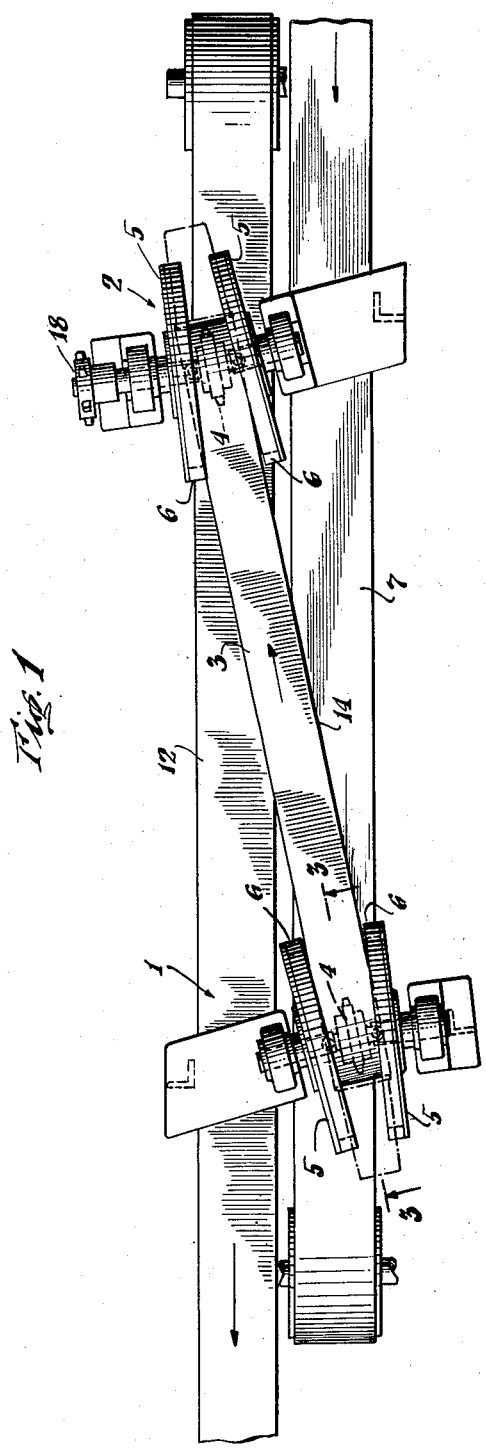
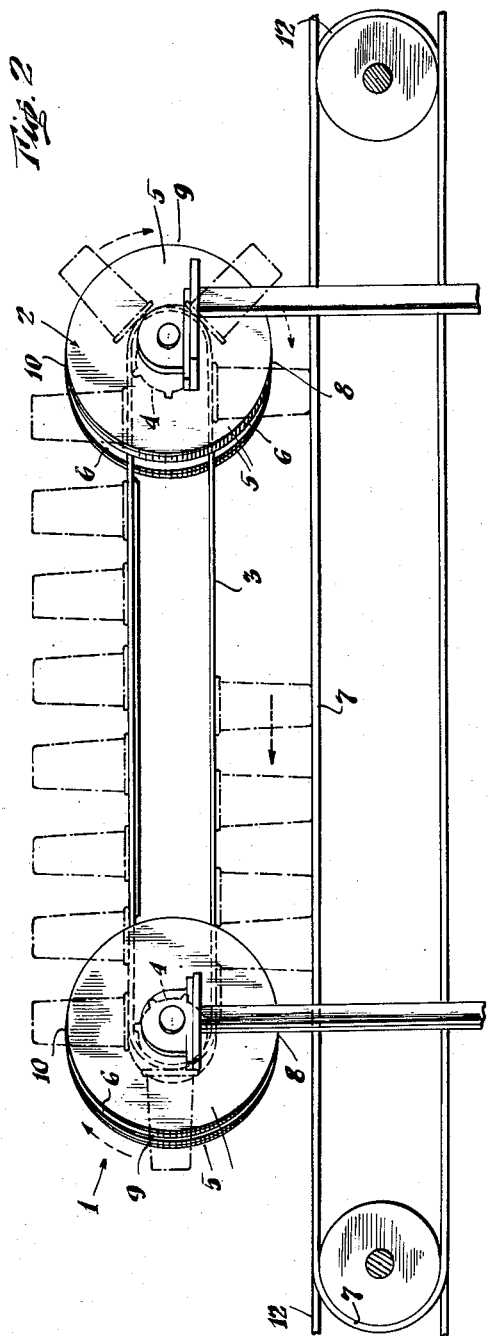
INVENTOR.
Harry E. Stover
BY Norman L. Holland
ATTORNEY

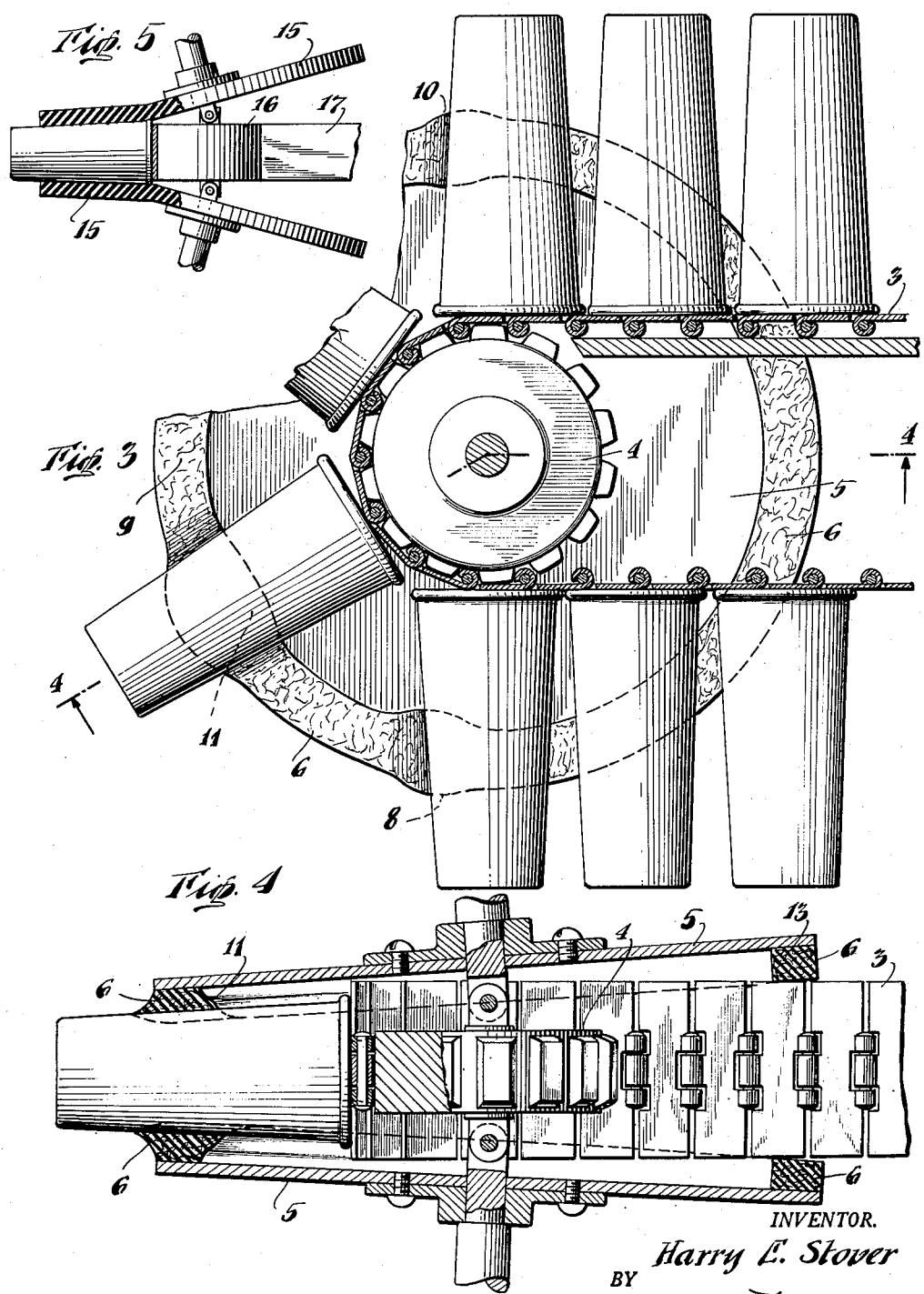

April 22, 1952  H. E. STOVER  2,593,627
INVERTING APPARATUS
Filed Sept. 8, 1949  4 Sheets-Sheet 3
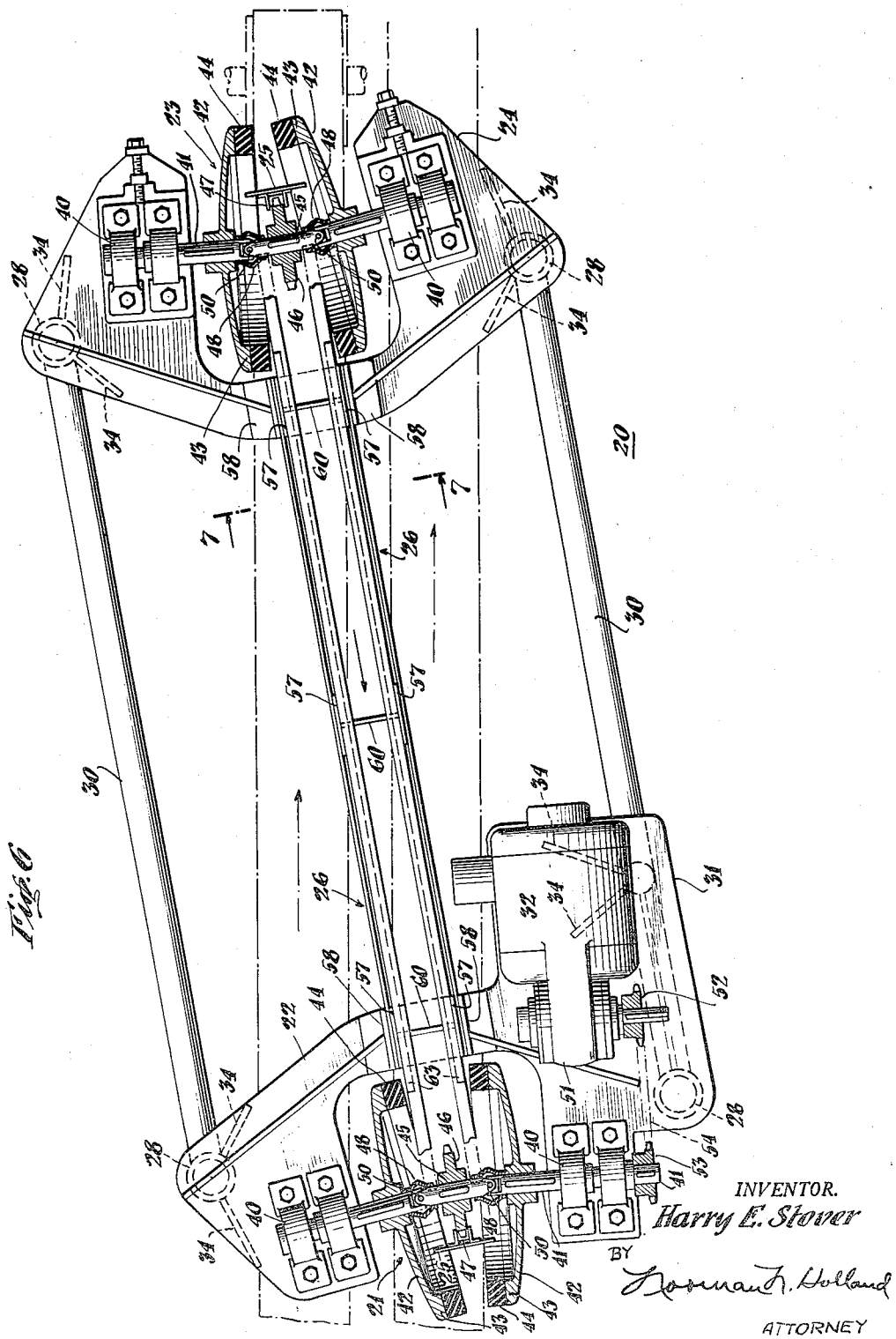
INVENTOR.
*Harry E. Stover*
BY
*Norman L. Holland*
ATTORNEY April 22, 1952      H. E. STOVER      2,593,627
INVERTING APPARATUS
Filed Sept. 8, 1949      4 Sheets-Sheet 4
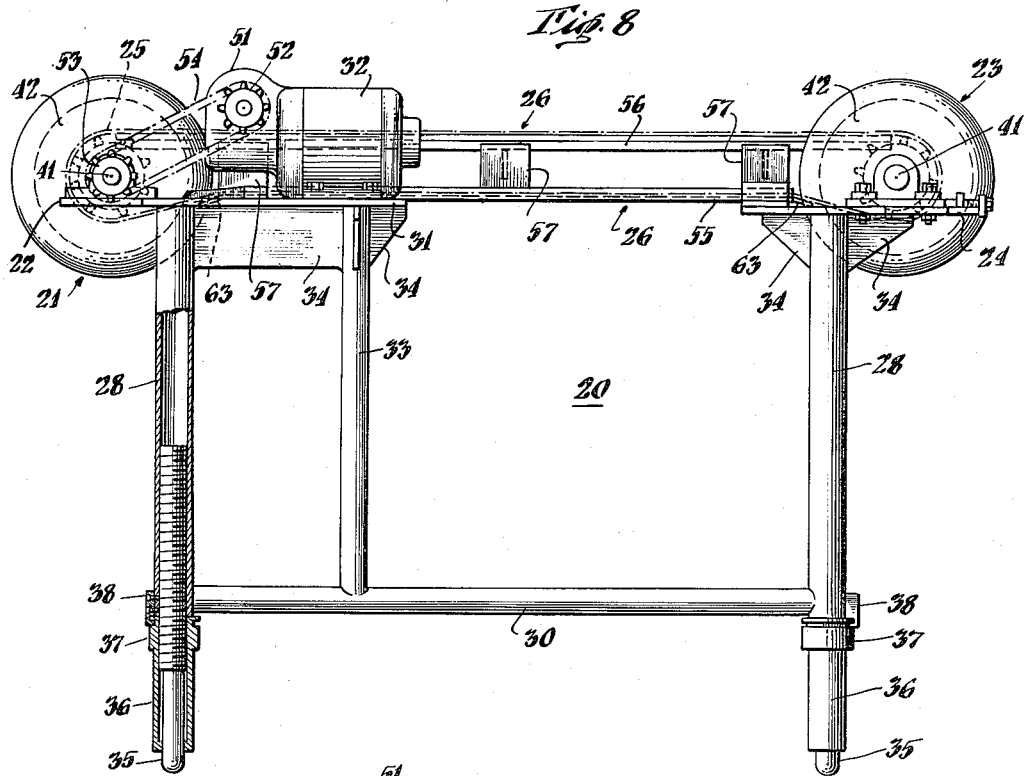
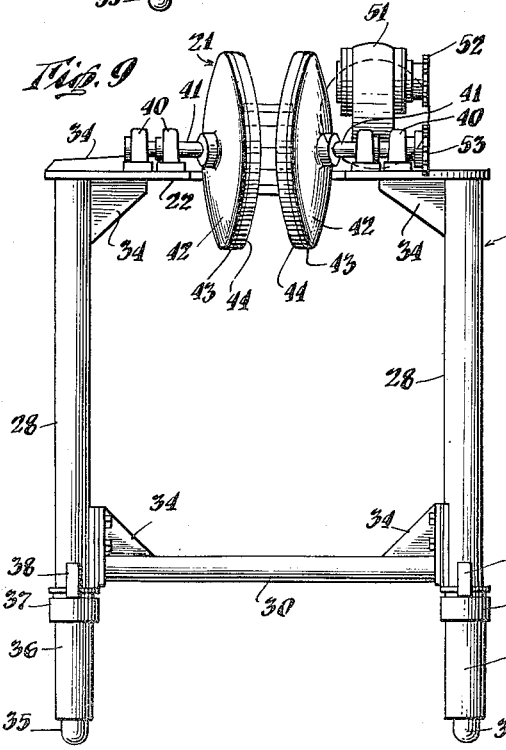
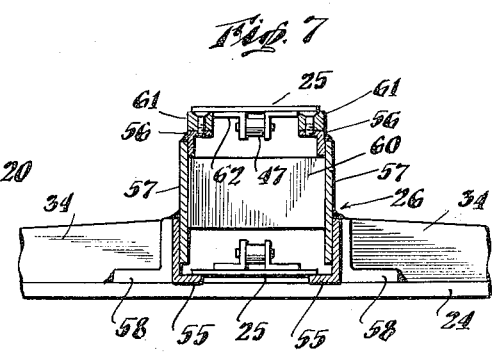
INVENTOR.
Harry E. Stover
BY
Norman N. Holland
ATTORNEY Patented Apr. 22, 1952

2,593,627

UNITED STATES PATENT OFFICE 2,593,627

INVERTING APPARATUS

Harry E. Stover, Lancaster, Ohio, assignor to Anchor Hocking Glass Corporation, Lancaster, Ohio, a corporation of Delaware Application September 8, 1949, Serial No. 114,546

15 Claims. (Cl. 198—33)

The present invention relates to an apparatus for inverting and conveying containers and other objects, and more particularly this invention is designed to operate in a production line to invert sealed containers so that the head space will be sterilized without disturbing the speed or direction of the line.

The present invention is particularly useful in inverting freshly sealed glass containers which have just been filled with a hot product in a liquid or semi-liquid state. This hot product, when the container is inverted, destroys bacteria which may exist on the underside of the container cap. The present invention accomplishes this sterilization by automatically inverting the freshly sealed containers, carrying them for a while in their inverted position and then reinverting them, without disturbing production line speed and without in any way damaging the containers, or their seals.

The present invention contemplates an inverting mechanism comprising gripping means, mounted to rotate together. Containers or other articles of manufacture are led between the rotary gripping means which grip them and rotate them to an inverted position. The gripping means are sufficiently flexible so that they will compress or bend to hold articles gently but firmly during inversion.

The present invention further contemplates conveying means running between the gripping means to take containers or other articles to or from the gripping means. The conveying means may be in the form of a conveyor belt running over a central member mounted to rotate with the rotary gripping means. The conveyor belt not only takes containers or other articles to or from the gripping means thereby allowing uninterrupted production line operation but may also assist the gripping means in engaging the articles during rotation. The conveying means usually runs between two inverting mechanisms, connecting the two so that one inverts the articles or containers and the other turns them right side up after the head space is sterilized. It may be desirable to have several such pairs of inverting mechanisms in series so that there will be adequate time or opportunity for sterilization.

It is an object of the present invention to provide an apparatus for inverting containers and other articles of manufacture which will operate as a part of a production line at production line speed.

Another object of the invention is to provide a mechanism which inverts containers or other articles of manufacture through a rotating action which moves the articles from one moving conveyor to another without disturbing the speed of the conveyors.

Another object of the invention is to provide an inverting mechanism which comprises a pair of wheels, discs or equivalent members rotating at production line speed in planes inclined to each other, said wheels automatically gripping, inverting, and releasing articles through their converging diverging action during rotation.

Another object of the invention is to provide such an inverting mechanism with gripping means adapted to grip articles firmly during rotation and at the same time protect them from being crushed or otherwise injured by the converging action of the wheels.

Another object of the invention is to provide a pair of flexible wheels which will grip the containers or articles of manufacture and flex or bend during rotation to protect them from being crushed by the converging diverging action of the wheels.

Another object of the invention is to provide a self contained inverting unit adapted to be inserted in a production line to invert articles, carry them for a while in an inverted position and then turn them right side up, all at production line speed.

Another object of the invention is to invert, carry and reinvert articles in a series of operation performed by a series of inverting mechanisms connected through a series of conveying means running at production line speed.

Another object of the invention is to provide a mechanism for inverting containers which is simple and durable and which has a minimum of moving parts to insure dependability.

Other and further objects of the invention will be obvious upon an understanding of the illustrative embodiments about to be described, or will be indicated in the appended claims, and various advantages not referred to herein will occur to one skilled in the art upon employment of the invention in practice.

A preferred embodiment of the invention and other embodiments have been chosen for purposes of illustration and description and are shown in the accompanying drawings, forming a part of the specification, wherein:

Fig. 1 is a plan view of a set or pair of inverting mechanisms and their conveyors;

Fig. 2 is a side elevational view of the same set;

Fig. 3 is a sectional view of one inverting mechanism taken along the line 3—3 of Fig. 1;

Fig. 4 is a sectional view along the line 4—4 of Fig. 3;

Fig. 5 is a schematic representation of another embodiment of the invention;

Fig. 6 is a plan view of the preferred embodiment of the invention;

Fig. 7 is a partial sectional view taken along the line 5—5 of Fig. 6;

Fig. 8 is a side elevational view of the preferred embodiment; and

Fig. 9 is an end elevational view of the same embodiment.

The preferred form of apparatus is illustrated in Figs. 6 to 9, but the apparatus of Figs. 1 to 5 may be used and will be described first for convenience.

Referring more particularly to Figs. 1-4, there is shown one form of the invention comprising a pair of inverting mechanisms 1 and 2 connected by a conveyor belt 3 running over sprocket wheels 4 rotating with each mechanism. Each of the inverting mechanisms comprises a pair of wheels 5 mounted to rotate in planes inclined to each other. Flexible annular gripping rings 6 are secured to the inner sides of these wheels at their peripheries. These may be made of rubber or some other sufficiently strong and flexible material.

Containers or other articles of manufacture are brought to the first pair of wheels 1 by the supply conveyor 7 where they are engaged by the gripping rings 6 as they converge near the intermediate point of approach of said rings below the center of the wheels 8 and rotated through their nearest point of approach 9 to an inverted position near the intermediate point of approach of said rings above center 10. The diverging motion of the rings releases the inverted articles at this point so that they are free to travel on the conveyor belt 3 to the second pair of wheels 2.

When the containers or other articles reach the second pair of wheels the inverting process is reversed so that the articles are rotated to an upright position and delivered to the conveyor 12 which removes them or delivers them to another operation. Of course if for any reason it is desirable to invert, carry and reinvert containers for instance, more than once, the conveyor 12 can act as a supply conveyor to another inverting mechanism and the operation can be repeated to any extent desired.

Figs. 3 and 4 show how the flexible gripping rings 6 act with the conveyor belt 3 to hold and invert containers or other articles of manufacture. The belt 3 shown, is a metal link chain belt which is advantageous because of its durability and positive action. Shown passing through the unit are glass containers with metal caps, a type of product which must be handled with care.

The gripping rings 6 engage the containers first at 8 if rotating clockwise with containers entering on a supply conveyor, or first at 10 if rotating counterclockwise with containers entering on the conveyor belt 3. It is obvious that a reversal of rotation merely causes a reversal in operation, so for purposes of description the wheels will be considered as rotating clockwise and the containers first engaging the gripping rings 6 at 8. The flexible gripping rings begin to compress and stretch upon contact and increase this action as the wheels rotate until they reach their point of nearest approach at 9 where the maximum compression occurs. As rotation continues beyond 9 the compression decreases until the containers are released at 10. It is important in the operation of the mechanism as shown that the gripping rings have the capacity to compress or flex to hold the containers gently but firmly during rotation and to protect them from being crushed by the converging action of the wheels. It is clear from Fig. 4 where a container is shown in position in the mechanism at the point 11 just ahead of the point of nearest approach of the wheels 9, that this container would have been crushed as the wheels moved closer together if the gripping rings 6 had not compressed and stretched as shown at 11 but had remained in the shape shown at 13. The ring should also possess a sufficient amount of resiliency to operate efficiently after inverting many thousands of containers.

The covers of the containers in Fig. 3 are shown contacting the metal link belt 3 as they approach the point 8. The belt 3 remains in contact with the containers as they are engaged and rotated to an inverted position so that when they are released at 10 the containers are in place on the belt and are carried away by it. The belt 3 also assists the gripping means 6 in holding the containers firmly during rotation, serving to prevent twisting or relative movement between the containers and the rings.

Fig. 5 shows the use of a pair of flexible discs 15 to replace the wheels and gripping rings in the inverting mechanism. These discs may be made of rubber or some other sufficiently strong and flexible material. Instead of depending upon separate gripping rings to flex and protect containers or other articles as they are rotated and inverted, the discs themselves begin to flex after they first contact the articles increasing this action until they reach what would be their nearest point of approach if rotating freely, shown in Fig. 5, and decreasing afterwards until the articles are released. A conventional pulley 16 and a conventional conveyor belt 17 running over the pulley are shown operating with the discs 15. As shown the belt 17 contacts the articles as did the belt 3, assisting the discs in the gripping and inverting operation, as well as removing them or delivering them to the discs to be inverted or reinverted.

The apparatus can be driven by its own electric motor or by interconnection to the drive of a sealing machine or other adjacent equipment. The motor or driving means is connected to the apparatus through the driving sprocket 18. The mechanism 2 turns with the sprocket wheel 18 which is directly connected to it, and the mechanism 1 is driven through the belt 3 and the sprocket wheels 4.

The preferred form of apparatus is illustrated in Figs. 6 to 9 of the drawings and will now be described. Referring to these figures there is shown an inverting unit 20 comprising the inverting mechanism 21 mounted on the platform 22, the inverting mechanism 23 mounted on the platform 24, the conveyor belt 25 running between the two mechanisms and over the conveyor support 26, and the stand described below of which the platforms 22 and 24 and the conveyor support 25 are parts.

The stand more particularly comprises four upright legs 28, connected with cross members 30 and carrying adjacent their upper portions a platform 22 which has an extension 31 for holding the driving motor unit 32. A bracing member 33 may extend from the platform extension 31 to the cross member below it. A second platform 24, at the opposite end of the stand from the platform 22, may assist in supporting the inverting mechanism 23. The conveyor support 26 extends between the two inverting mechanisms and connects the two platforms. Suitable strengthening brackets 34 may be provided at desired locations.

Each of the four legs 28 is shown as a metal pipe or tube having a cylindrical foot 35 which fits inside the leg after passing through a collar member 36 which is threaded to the foot. The collar member 36 has a flange member 37 adjacent its upper end which abuts against the end of the leg and may be locked to the leg by the locking member 38 which in turn is screwed to the leg and fits in a groove in the flange member 37.

The feet 35 can be adjusted upwards or downwards, to regulate the height of the unit, by loosening the locking member 38 so that the collar members 36 are freed and then turning the collar members relatively to the feet 35 so that the feet move up or down in the threads. When a desired height is reached by adjustment in this manner the collar member flanges 37 are again locked in place by tightening the locking members 38.

Each inverting mechanism includes a pair of double bearings 40 which rotatably support shafts 41. The bearings are shown mounted on the platforms 22 and 24 so that the shafts 41 are angularly disposed to one another. Keyed to each shaft is a disc or member 42 of concave or slightly curved shape which has a flange like portion 43 at its periphery. Thus each pair of shafts 41 holds a pair of flanged discs rotatable in planes inclined to each other. Yieldable or flexible gripping rings 44 are shown mounted opposite each other on the flanges 43. These rings cooperate with the conveyor belt 25 to invert containers or other articles. Each pair of discs is connected by a central member 45, universally coupled to rotate with them. Keyed to the central member is a gear 46 having teeth designed to mesh with the engaging extension 47 on the inside of the conveyor belt 25. The guards 48 serve to prevent matter from jamming in the universal couplings 50.

The concave discs 42 and the annular flanges 43 allow the mechanisms to invert articles having wider upper portions than lower portions. An example of this might occur with a container tapered away from its top and having a cap or closure extending radially beyond the container itself. Such a container could be engaged by the gripping rings 44 on its narrow, lower portion with its top extending inwardly against the belt.

The unit may be driven by the driving motor unit 32, which through the reduction gear 51, turns the gear 52 which is connected to the gear 53 by the chain belt 54. The gear 53 is directly connected to one of the shafts 41 of the inverting mechanism 21 and drives the mechanism. The gear 46 which is keyed to the central member 45 of the inverting mechanism 21 turns with the mechanism to drive the belt 25 through the belt engaging extensions 47. The belt 25 in turn drives the gear 46 of the inverting mechanism 23 which in turn drives the mechanism 23. Thus the whole unit is positively driven through one motor geared to one shaft of one inverting mechanism.

The conveyor support 26 which also acts as a guide or lift to raise the lower portion of the belt comprises two lower angles 55 and two upper angles 56. The angles 55 are spaced from each other and run across the platforms 22 and 24 to which they are secured. The angles 56 are secured to three pairs of six vertical plates or brackets 57; two at platform 22, two at platform 24, and two between the platforms. Four of the plates 57 are welded to angle brackets 58 which in turn are welded to the platforms 22 and 24, while the two plates between the platforms are each welded to an upper and lower angle. Each pair of plates 57 may have a cross bracket 60 welded between them to strengthen the structure.

Each of the upper angles 56 has a sliding member 61 screwed to it over which the conveyor belt 25 moves. The angles are spaced to accommodate the engaging extension 47, and the portion 62 of the belt may fit between the sliding members to thereby maintain the belt in position.

The upper angles 56 and sliding members 61 extend into the inverting mechanisms to points directly over the central members 45. Thus as soon as the belt loses the support of one of the gears 46 it rests upon the ends of the sliding members 61 and moves along without sagging in a substantially horizontal plane between the two gears. Without the support of the member 26 the loaded belt 25 would begin to sag immediately after leaving one of the gears 46 and satisfactory operation would be almost impossible.

The lower angles 55 are turned inward and spaced so that the return portion of the belt 25 fits over their horizontal legs and between their vertical legs. The angles 55 are at such a height that if continued horizontally they would contact the gears 46 somewhere between their centers and their lowermost points. Since the object of these angles is to form a guide which will raise the return portion of the belt so that it will not contact articles moving directly below it, the ends 63 of the angles are bent downward at an angle so that the return portion of the belt 25 can run up the incline formed by these bent ends and be carried along in a raised position in the angles 55.

While the present invention has been shown as having endless conveyor belts running over sprocket wheels or pulleys mounted between the wheels it will be understood that other types of conveyors may be utilized without departing from the spirit or scope of the invention.

It will be seen that the present invention inverts containers or other articles of manufacture through a rotating action which moves the articles from one conveyor to another without disturbing the speed of these conveyors or stopping the movement of the articles in the production line. The flexible gripping rings or flexible discs engage the articles firmly and compress and flex to protect the articles from crushing during the converging diverging action of the rings or discs during rotation. The converging diverging action of the rings or discs with this flexing action allows the mechanisms to automatically grip, invert and release articles at production line speed. The articles are inverted by one mechanism carried for a while in an inverted position on a conveyor belt between the mechanisms and then reinverted by a similar mechanism. These inverting, carrying, and reinverting operations can be performed by a single movable unit which can be inserted in production line, regulated as to height, and operated independently but at the same speed as the production line. Any number of these sets of mechanisms can be connected in series so that the articles could be inverted and reinverted to any desired extent. The apparatus is simple and durable and has a minimum of moving parts to insure dependability.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device of the class described, the combination of gripping means mounted to rotate with adjacent gripping means, adjacent gripping means mounted to rotate in a plane inclined to that of the first mentioned gripping means, rotatable means extending between and connected with said first mentioned gripping means and said second mentioned gripping means adapted to rotate with said means and to support conveying means, and conveying means supported by said rotatable means for conveying containers and other articles.

2. In a device of the class described, the combination of a pair of wheels mounted to rotate about axes out of alignment with each other, flexible gripping means facing each other on said wheels, means mounted between and interconnecting said wheels adapted to rotate with the wheels and to support conveying means, and conveying means supported by said latter means adapted to be actuated thereby to convey containers or other articles.

3. In a device of the class described, the combination of a pair of wheels mounted to rotate in planes inclined to each other, flexible gripping means facing each other on said wheels, means including a toothed member between said wheels and generally coaxially thereof adapted to rotate with the wheels and to support a conveyor, and a conveyor passing around said toothed member and having portions in engagement therewith for conveying containers and other such articles, said flexible gripping means engaging said articles on one side of the rotational axis of said member and rotating them to an inverted position on an other side of the rotational axis of said member, while flexing to protect said articles from crushing and to hold them firmly during rotation.

4. In a device of the class described, the combination of a pair of wheels mounted to rotate about axes out of alignment with each other, said wheels having outer annular portions extending inwardly with respect to adjacent portions, resilient gripping rings mounted opposite each other on said annular portions, a member between and generally coaxially of said wheels adapted to rotate with the wheels, a conveyor extending about said member, and supply means to bring containers and other articles to said wheels where they are engaged by said gripping rings and said conveyor and rotated through a substantially semi-circular arc to an inverted position, said conveyor removing the inverted articles from the wheels.

5. In a device of the class described, the combination of a pair of wheels mounted to rotate in planes inclined to each other, yieldable gripping means facing each other on said wheels, a similar pair of wheels with similar gripping means mounted at a distance from the first mentioned wheels, conveying means to bring articles such as containers to the first mentioned wheels where they are gripped and rotated to an inverted position, and additional conveying means angularly disposed with respect to said first conveying means adapted to transfer the inverted articles from the first mentioned pair of wheels to the second mentioned pair of wheels where they are gripped and rotated to their former position.

6. In a device of the class described, the combination of a pair of gripping means mounted to rotate together, said pair of gripping means being adapted to grip, invert and release articles such as containers, central means between said pair of gripping means adapted to rotate therewith, a second pair of gripping means with similar central means mounted at a distance from the first pair of gripping means, and a conveyor extending between and passing around each of said central means adapted to move said articles from one pair of gripping means to the other.

7. In a device of the class described, the combination of a pair of gripping means mounted to rotate in planes inclined to each other, rotatable means mounted between said pair of gripping means adapted to rotate therewith, a second pair of gripping means with similar rotatable means mounted at a distance from the first pair of gripping means, and conveying means extending between said rotatable means adapted to move articles from one to the other of said pair of gripping means.

8. In a device of the class described, the combination of a pair of rotatable gripping means, said pair of gripping means being adapted to grip, invert and release articles, rotatable support means between said pair of gripping means, a second pair of gripping means with similar rotatable support means mounted at a distance from the first pair of gripping means, a conveyor passing around each of said rotatable support means to move said articles from one pair of gripping means to the other, and means intermediate said pairs of gripping means for slidably supporting said conveyor and preventing it from sagging when said conveyor carries said articles from one pair of gripping means to the other.

9. In a device of the class described, the combination of a pair of gripping members mounted to rotate in planes inclined to each other, rotatable support means between said pair of gripping means, a second pair of gripping members with similar rotatable support means mounted at a distance from the first pair of gripping means, a conveyor passing around each of said rotatable support means to move articles from one pair of gripping means to the other, means slidably supporting an upper portion of said conveyor maintaining said upper portion substantially flat intermediate the rotatable support means, and means intermediate said rotatable support means for raising and slidably supporting a lower return portion of said conveyor thereby preventing contact between the tops of said articles and the lower portion of said conveyor before said articles reach one of said support means.

10. In a device of the class described, the combination of a pair of gripping means mounted to rotate in planes inclined to each other, rotatable means between said pair of gripping means adapted to rotate therewith, a second pair of gripping means with similar rotatable means mounted at a distance from the first pair of gripping means, a conveyor passing around each of said rotatable means adapted to support and move articles from one pair of gripping means to the other, said conveyor having extensions on its inner side adapted to positively engage each of said rotatable means so that one pair of gripping means may be driven through the other, and spaced slide members extending longitudinally beneath and supporting an upper portion of said conveyor to prevent said conveyor from sagging.

11. In a device of the class described, the combination of a pair of wheels mounted to rotate in planes inclined to each other, flexible gripping means facing each other on said wheels, support means mounted between said wheels adapted to rotate with the wheels and to support a conveyor, a second pair of wheels with flexible gripping means and support means mounted at a distance from the first mentioned wheels, a conveyor passing around each of said support means adapted to move articles from one pair of wheels to the other pair of wheels, supply means angularly disposed with respect to the path of movement of said conveyor for bringing articles to the first pair of wheels where they are engaged by its gripping means and rotated through a substantially semi-circular arc and delivered in inverted position onto said conveyor, said conveyor moving said articles to the other set of wheels where they are engaged by its gripping means and rotated to substantially their original position for release onto a removing means, and remaining means for removing the articles from the latter wheels.

12. In a device of the class described, the combination of a pair of rotatable members having planes of rotation angularly disposed to each other, at least one of said members having an inwardly disposed gripping portion, means disposed generally coaxially with respect to said rotatable members adapted to support a conveyor, and a conveyor supported by and rotatable about said means.

13. In a device of the class described, the combination of a pair of rotatable members having planes of rotation angularly disposed to each other, each of said members having an inwardly disposed annularly extending yieldable gripping portion, means disposed generally coaxially with respect to said rotatable members adapted to support a conveyor, and a conveyor supported by and rotatable about said means.

14. In a device of the class described, the combination of a pair of rotatable members having planes of rotation angularly disposed to each other, each of said members being yieldable to conform to portions of articles therebetween, means disposed generally coaxially with respect to said rotatable members adapted to support a conveyor, and a conveyor supported by and rotatable about said means.

15. A device as claimed in claim 12, in which said gripping portion is carried by an annular peripheral portion that projects from one rotatable member toward the other rotatable member.

HARRY E. STOVER.

REFERENCES CITED

The following references are of record in the file of this patent:

UNITED STATES PATENTS

| Number | Name | Date |
| --- | --- | --- |
| 522,259 | Hodgson | July 3, 1894 |
| 699,244 | Rubin | May 6, 1902 |
| 1,210,096 | Parker | Dec. 26, 1916 |
| 1,454,051 | Heulings | May 8, 1923 |
| 1,717,577 | Mitchell | June 18, 1929 |
| 1,770,099 | Humy | July 8, 1930 |
| 2,362,517 | Woodberry | Nov. 14, 1944 |
| 2,406,176 | Vergobbi | Aug. 20, 1946 |
| 2,536,057 | Hodson | Jan. 2, 1951 |

FOREIGN PATENTS

| Number | Country | Date |
| --- | --- | --- |
| 530,362 | Germany | July 28, 1931 |